United States Patent
Tanaka

[15] 3,667,363
[45] June 6, 1972

[54] FILM SENSITIVITY COMPENSATED LIGHT MEASURING NETWORK AND FILM MAGAZINE

[72] Inventor: Harumi Tanaka, Kobe, Japan
[73] Assignee: Minolta Camera Kabushiki Kaisha, Osaka, Japan
[22] Filed: Oct. 14, 1970
[21] Appl. No.: 80,703

[52] U.S. Cl. ...........................................95/31 CA, 95/10 C
[51] Int. Cl. .......................................................G03b 17/26
[58] Field of Search ................95/10 C, 31 R, 31 CA, 31 FS, 95/64 R, 64 D; 352/72, 78 R, 78 C, 141

[56] References Cited

UNITED STATES PATENTS

| | | | |
|---|---|---|---|
| 3,492,927 | 2/1970 | Thiele et al. | 95/10 C |
| 3,421,421 | 1/1969 | Hahn et al. | 95/31 FS X |
| 3,402,650 | 9/1968 | Hoadley | 95/31 FS X |

Primary Examiner—Joseph F. Peters, Jr.
Attorney—Stanley Wolder

[57] ABSTRACT

A camera includes a light responsive network having a pair of first and second terminals the resistance between which varies the network sensitivity and which are connected to first and second contact elements exposed in the camera film magazine chamber. A film magazine carries a resistor tape whose value corresponds to the film sensitivity and which is releasably engaged by the contact elements to correspondingly vary the network sensitivity. Alternatively, a plurality of spaced second contact elements are provided which are connected to the second network terminal through respective resistors and the film magazine carries a conductor tape of a shape and position in accordance with the film sensitivity and which engages predetermined second contact elements to provide a resistance between the network terminals to adjust its sensitivity in accordance with the film sensitivity. The resistor or conductor tape is the pressure sensitive tape securing the magazine cover.

5 Claims, 9 Drawing Figures

INVENTOR
HARUMI TANAKA
BY Stanley Wolder
ATTORNEY

INVENTOR
HARUMI TANAKA
BY Stanley Wolder
ATTORNEY

FILM SENSITIVITY COMPENSATED LIGHT MEASURING NETWORK AND FILM MAGAZINE

BACKGROUND OF THE INVENTION

The present invention relates generally to improvements in photographic equipment and it relates more particularly to an improved camera provided with a light responsive network which is automatically adjusted to the sensitivity of the film in a magazine loaded in the camera and it relates also to an improved film magazine for use in such cameras.

In the conventional camera having a light responsive automatic control or light measuring system including a film sensitivity compensating mechanism, an element is provided which senses and reacts to a coded index defining notch or projection disposed on the film magazine loaded in the camera to effect the adjustment of compensation of the exposure value or indication provided by the control or measuring system in accordance with the sensitivity of the film in the magazine loaded in the camera. This type of camera possesses numerous disadvantages. By reason of the space required consequent to the movement of the index sensing element and the bulk of the compensating mechanism considerable space in the camera is occupied by the mechanism and any attempts to provide a more compact mechanism for incorporation into miniature cameras have been unsatisfactory and have resulted in low reliability systems.

Moreover, the film magazines employed in the conventional camera of the above type likewise possesses many drawbacks. Since magazines for films of different sensitivities are correspondingly differently dimensioned so that they may properly control the index sensing mechanism, this contributes to the cost of manufacture, inventory, and handling, and such magazines otherwise leave much to be desired.

SUMMARY OF THE INVENTION

It is a principal object of the present invention to provide an improved camera having a light responsive network which is automatically adjusted in accordance with the sensitivity of the film in a magazine loaded in the camera.

Another principal object of the present invention is to provide an improved film magazine for automatically adjusting the light responsive network in a camera in which the magazine is loaded in accordance with the sensitivity of the film.

Still another object of the present invention is to provide in a camera provided with a light responsive network an electrical system for automatically adjusting the network in accordance with the sensitivity of the film in a magazine loaded in the camera.

A further object of the present invention is to provide a film magazine having an electrical element of a value or dimension in accordance with the sensitivity of the film in the magazine for correspondingly adjusting a light responsive network in a camera in which the magazine is loaded.

Still a further object of the present invention is to provide a film magazine of the above nature which may be employed in cameras which possess or lack automatically compensated light responsive networks.

Another object of the present invention is to provide an improved camera and magazine of the above nature characterized by their compactness, reliability, low cost, versatility and adaptability.

The above and other objects of the present invention will become apparent from a reading of the following description taken in conjunction with the accompanying drawings which illustrate preferred embodiments thereof.

In a sense the present invention contemplates the provision of an improved camera as well as improved indexed film magazine for use with the camera in which the camera includes a light responsive network having a pair of terminals, the resistance between which controls a parameter of the light responsive network, and spaced first and second contact elements communicating with the camera film magazine chamber and connected to the network terminals and adapted to releasably engage an electrical element on a film magazine loaded in the chamber. The film magazine carries an electrical index element having a parameter varying in accordance with the film sensitivity and which is advantageously a thin band or web which is supported by a face of the film magazine so as not to interfere with the use of the magazine in a conventional camera and may be in the form of a pressure sensitive or adhesive tape.

The index element may be a resistor whose resistance is of a value depending on the film sensitivity and is engaged by the contact elements to correspondingly adjust the light responsive network. In an alternative structure a plurality of spaced second contact elements are provided, each being connected through respective resistors to the corresponding second network terminal. The magazine indexing element is a highly conductive member whose shape or position depends on the film sensitivity so as to engage the first contact element and a predetermined number of the second contact elements to correspondingly adjust the light responsive network by varying the number of resistors connected and hence the resistance between the terminals in accordance with the film sensitivity. In the preferred embodiments of the present invention, the current responsive network includes a current meter or the like across which are connected in series a photoconductor, a battery and a resistor, the first terminal being at the resistor battery junction and the other terminal being at the photoconductor meter junction.

The improved camera with a light responsive network which is automatically electrically compensated in accordance with film sensitivity and the cooperating improved film magazine result in a compact, reliable and convenient system which is inexpensive, highly versatile and adaptable.

DESCRIPTION OF THE PREFERRED EMBODIMENTS

Figure 1:
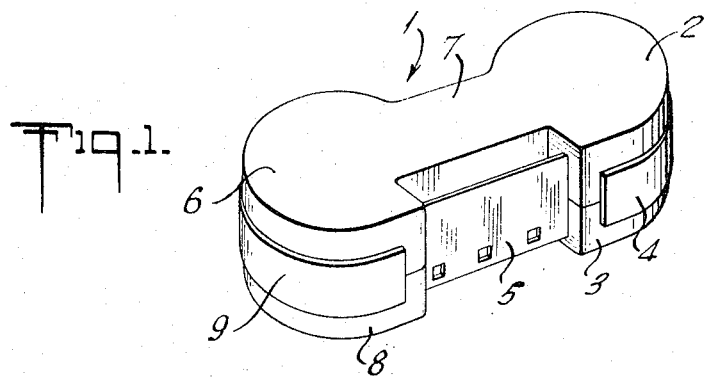
FIG. 1 is a perspective view of a film magazine embodying the present invention.
Figure 2:
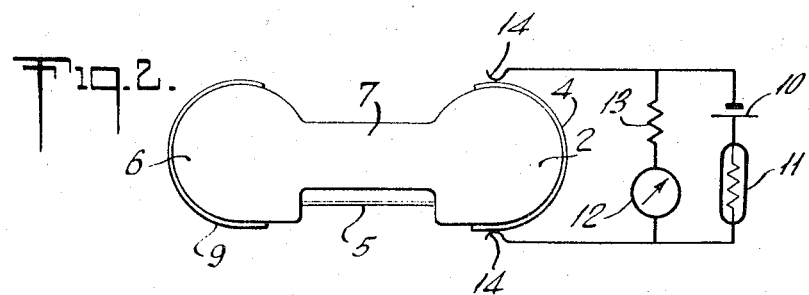
FIG. 2 is a diagrammatic view of the electrical network of a camera for use with the improved magazine and embodying the present invention.

Referring now to FIGS. 1 and 2 of the drawings, the present invention is described with respect to an embodiment thereof with reference to a 16 mm roll film magazine provided in the Japanese Industrial Standard; JIS–B7176. The film magazine 1 is of the same construction as that of the conventional magazine consisting of a film take-up chamber 2, a film supply chamber 6 and a bridge portion 7 connecting the both chambers 2 and 6. An adhesive tape 4 is provided to hold the cover 3 of the film take-up chamber 2 on the chamber 2 and another adhesive tape 9 holds the cover 8 of the film supply chamber 6 on the chamber 6. Instead of the ordinary adhesive or pressure sensitive tape, the tape 4 is made of a conductive resistor material so that the tape 4 may have electric resistance of the value corresponding to the sensitivity of the film 5 loaded in the film magazine. It will be noted that the tape 4 should be insulated from the body of the film magazine 1.

It will be understood that the position of the conductive tape is not limited to the position of the adhesive tape 4 holding the cover 3 on the film take-up chamber 2, but may be at the position of the adhesive tape 9 holding the cover 8 on the film supply chamber 6 or any suitable position. It will be evident that a separate conductive tape may be provided on the film magazine in place of the adhesive tapes 4 and 9.

In the camera, a pair of spaced contacts 14 located in the camera magazine chamber are connected to respective terminals of the ordinary exposure meter circuit consisting of an electric source 10, a photoelectric or photoconductor element 11 coupled in series with the source 10, an exposure or current meter 12 and a resistor 13 for compensating for the characteristic of the meter 12, both being connected in series with the electric source 10 and the photoelectric element 11. The pair of contacts 14 are connected in parallel with the resistor 13 and the exposure meter 12 at the relatively remote terminals thereof. The pair of contacts 14 are disposed in the camera so that the conductive tape provided on the film magazine loaded in the camera chamber may be brought into contact therewith. In accordance with the value of the resistance of the conductive tape 4 connecting the pair of contacts 14, the exposure meter 12 in the camera is automatically adjusted or controlled. Thus, the exposure value is compensated according to the sensitivity of the film in the film magazine just by putting or loading the film magazine into the camera body.

Figure 3:
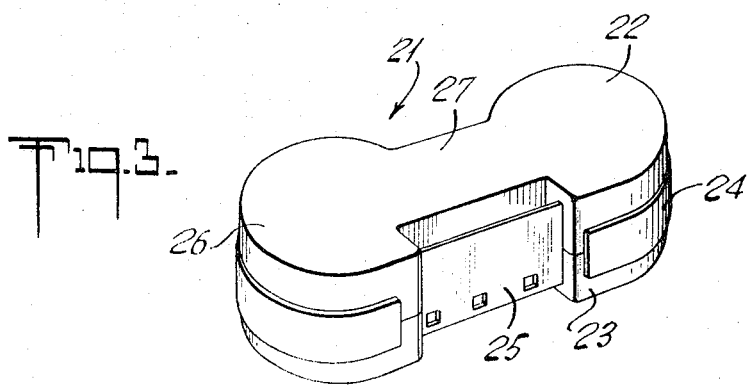
FIG. 3 is a perspective view of another form of film magazine embodying the present invention in which a low sensitivity film is loaded.
Figure 4:
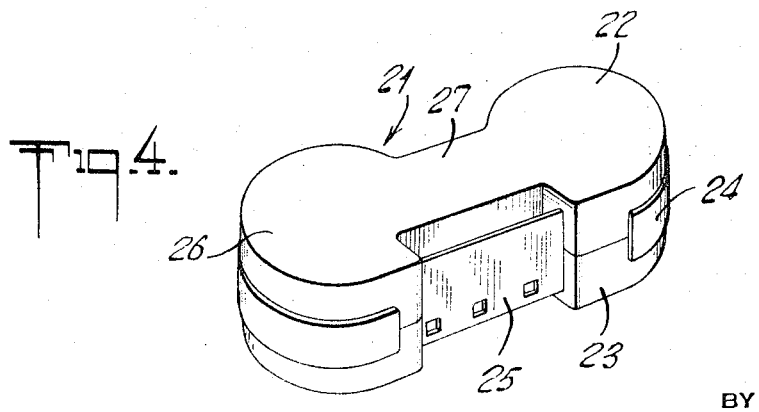
FIG. 4 is a view similar to FIG. 3 with the magazine loaded with a high sensitivity film.
Figure 5:
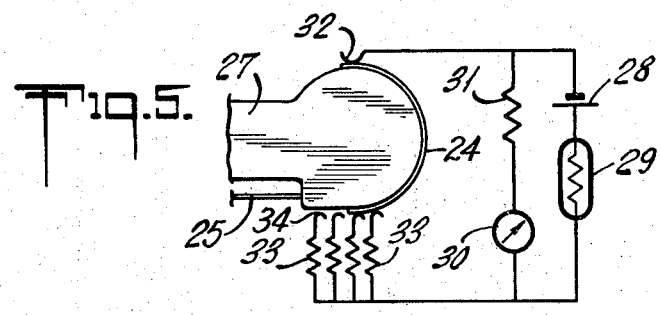
FIG. 5 is a view similar to FIG. 2 of a network for use with the magazine of FIGS. 3 and 4.

Referring now to FIGS. 3, 4 and 5 of the drawings, there is shown another embodiment of the present invention in which a film magazine 21 of the same shape as that described above consists of a film supply chamber 26, a film take-up chamber 22, a bridge portion 27 connecting the film supply chamber 26 with the film take-up chamber 22 therewith, and covers 23 covering the chambers 26 and 22 respectively is loaded with a roll film 25. The cover 23 fitted to the film take-up chamber 22 is held in the covered position thereon with an adhesive tape 24. This adhesive tape 24 is at least partially and preferably very highly conductive. If the film magazine 21 is not made of insulating material such as synthetic resin, there should be provided an insulating means between the conductive adhesive tape 24 and the surface of the film magazine 21. The conductive adhesive tape 24 may take the form of a thin plastic film coated on one surface thereof with adhesives and on the other surface with electric conductive layer.

The position of the conductive adhesive tape 24 on the film magazine is made different in accordance with the sensitivity of the film loaded therein. This difference in position is in the longitudinal direction of the tape 24 as clearly shown in FIGS. 3 and 4. It will be readily understood by one skilled in the art that the position of the conductive adhesive tape 24 is not limited to the above described position but may be on the bridge portion 27 or film supply chamber 26. Moreover, the difference in position of the conductive adhesive tape 24 in accordance with the sensitivity of the film loaded therein may be in the transverse direction of the tape toward the top or bottom of the film magazine 1.

In the camera for use with magazine 21 the automatic exposure compensating means includes an exposure meter comprising an electric source 28, a photoelectric element 29, an exposure meter 30, a resistor 31 for compensating the characteristic of the exposure meter 30, all said elements being connected in series, a first contact 32 connected to the terminal of the resistor 31 remote from meter 30 and a plurality of contacts 34 coupled respectively through a plurality of resistors 33, preferably of the equal resistance to the terminal at exposure meter 30 remote from resistor 31. As best shown in FIG. 5, the plurality of contacts 34 are arranged in the direction in which the difference in position of the tape 25 is made. The said first contact 32 is in contact with one point of tape 24 on the camera loaded magazine 21 and the plurality of contacts 34 are selectively in contact with the end of the tape 24 so that the first contact 32 may be short-circuited with the other contact 34 through the conductive tape 24. The plurality of contacts 34 are arranged with respect to the difference in position of the tape 24 so that the larger number of the contacts 14 may be in contact with the tape 24 in the case of loading a film of lower sensitivity and the smaller number of contacts 34 may be in contact with the tape 24 in the case of loading a film of higher sensitivity. Thus, a larger electric current flows through the circuit, accordingly, through the exposure meter, in the case of the higher sensitivity film, and a smaller electric current flows through the circuit in the case of lower sensitivity film.

The resistors 33 may be coupled with each other in series or in parallel. In the case that the resistors 33 are connected in series with each other and serve as the contacts 34, the contacts 34 may be replaced by the resistors 33. Or in other words, the plurality of contacts 34 and resistors 33 may be replaced by an elongated member having electric resistance to be in surface contact with the conductive tape 24 so that the area of the elongated member in contact with the tape may differ in accordance with the sensitivity of the film loaded therein.

Figure 6:
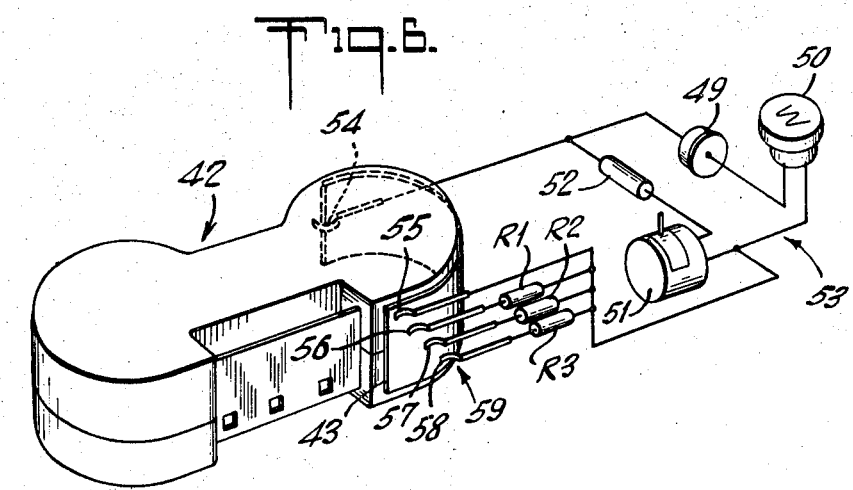
FIG. 6 is a view similar to FIG. 2 of another form of camera network.
Figure 7A:
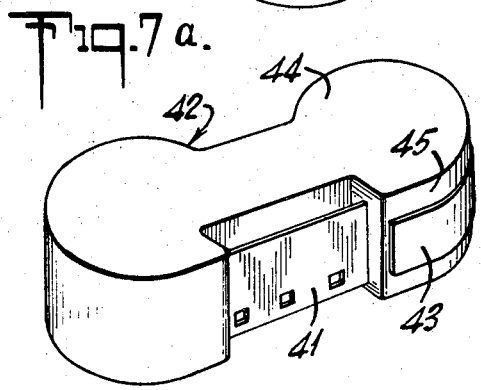
FIGS. 7a, 7b, and 7c are perspective views of the improved magazines for use in the improved camera with the network shown in FIG. 6, each magazine being loaded with a different type of film.
Figure 7B:
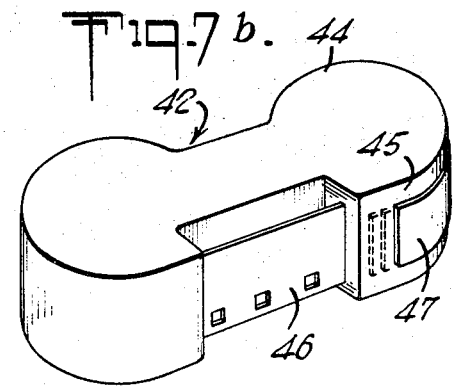
Figure 7C:
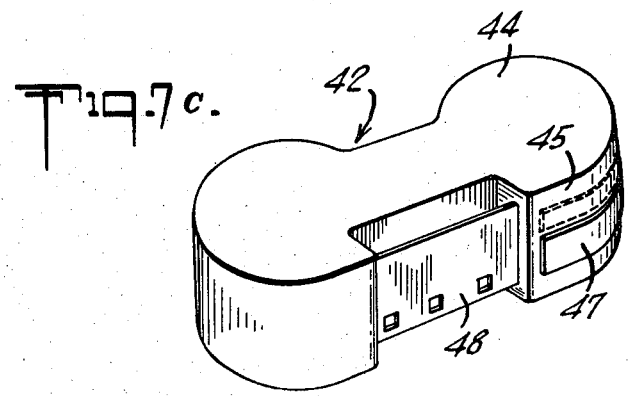

Now referring to FIGS. 6 to 7c of the drawings which illustrate a further embodiment of the present invention as applied to film magazine 42 as earlier described and containing a black and white film 41 therein, magazine 42 is provided with a resistive member such as a resistive adhesive tape 43 having different resistances according to the sensitivity of the film loaded therein. The tape 43 is fixed to a fixed position regardless of the sensitivity of the film in the arrangement shown in FIG. 7a.

As shown in FIG. 7b, a film magazine containing a negative color film 46 is provided with a conductive tape 47 attached to the peripheral surface 45 of the film take-up chamber thereof at the different position according to the sensitivity of the film loaded therein.

As shown in FIG. 7c, a film magazine containing a positive color film 48 is provided with a conductive tape 47 attached to the peripheral surface 45 of the film take-up chamber 44 thereof at the different position according to the sensitivity of the film loaded therein.

The conductive tape 47 attached to the film magazine for the negative color film is positioned at different positions differing in the longitudinal direction of the tape. On the other hand, the difference in position of the conductive tape 47 attached to the film magazine for the positive color film is made in the transverse direction of the tape.

And the position of the tape 43 of the black and white film magazine is made different from the position of the conductive tape 47 of the color film magazine whatever may be the sensitivity of the film.

In the improved camera there is provided a conventionally known type of the exposure meter circuit network 53 including a power source battery 49, a photoelectric element 50, an exposure meter 51 and a resistor 52 for compensating the exposure meter characteristic. The exposure meter circuit 53 further includes a first contact 54 to be normally in contact only with a resistive tape 43 and a displaced conductive tape 47. In the circuit 53 there is further provided a set of second contacts 59 consisting of a contact 55 to be in contact only with the resistive tape 43 and other contacts 56, 57, 58 having resistors $R_1$, $R_2$, $R_3$ respectively of different resistance to be in contact with the displaced conductive tape 47. The resistance of the resistors $R_1$, $R_2$, $R_3$ correspond to the film sensitivity and the contacts 56, 57, 58 connected to those resistors are located in stepped positions as shown in FIG. 6 so that the contacts 56, 57, 58 may be selectively in contact with the conductive tape 47 attached to the different positions on the film magazine.

The set of second contacts 59 is incorporated in the camera so that the second contacts 59 may be retracted from the film magazine chamber when the camera cover is opened. For instance, the set of second contacts 59 may be disposed on the inside of the back cover of the camera.

In operation, when the film magazine 42 containing a black and white film 41 is loaded in the camera, the first contact 54 and the contact 55 are brought into contact with the resistive tape 43 on the film magazine 42. According to the resistance of the tape 43, the electric current representing and compensating for the sensitivity of the film flows through the exposure meter circuit of the camera. Thus, the exposure is compensated according to the sensitivity of the black and white film.

In the case that a film magazine containing a negative color film 46 or a positive color film 48 is loaded into the camera in accordance with the present invention, the first contact 54 and some of the second contacts 56, 57, 58 are brought into contact with the conductive tape 47. According to the value of the resistance connected with the circuit, after the film magazine is loaded, through the contacts 54 and 56, 57, 58 and the conductive tape 47, the automatic exposure control means in the camera is compensated with respect to the sensitivity of the film loaded in the camera.

In the last described embodiment of the present invention, the type of the film, e.g. black and white, negative color or positive color, can be distinguished by observing the position of the tape attached thereto.

The correspondence between the film type and the position of the attached tape is not limited to that shown in the last described embodiment.

While there have been described and illustrated preferred embodiments of the present invention it is apparent that numerous alterations, omissions and additions may be made without departing from the spirit thereof.

I claim:

1. A film magazine for use in a camera including a light responsive network the resistance between a pair of predetermined points of which controls an operating parameter of said network and a pair of spaced first and second contacts respectively connected to said network predetermined points, said magazine comprising a body member including a film housing chamber including cover and base members, and an electrical element carried by said body member and comprising an adhesive tape securing said cover member to said base member and having a parameter varying in accordance with the sensitivity of said film and adapted to be releasably interconnected between said contacts when said magazine is loaded in said camera whereby to control the resistance between said predetermined points and of said network in accordance with said film sensitivity.

2. The film magazine of claim 1 wherein said electrical element has a resistance value in accordance with said film sensitivity and engages said contacts when said magazine is in a camera loaded position.

3. The film magazine of claim 1 wherein said electrical element comprises a highly conductive band located on the outer face of said body member and dimensioned in accordance with said film sensitivity, said magazine being for use with said light responsive network provided with a plurality of spaced second contacts connected to a respective network predetermined point through resistors whereby said first contact and a number of said second contacts, in accordance with said conductive band dimension, releasably engage said conductive band on said camera loaded magazine to control said network in accordance with said film sensitivity.

4. The film magazine of claim 1 wherein said electrical element comprises a highly conductive band located on the outer face of said body member and positioned thereon in accordance with said film sensitivity, said magazine being for use with said light responsive network provided with a plurality of spaced contacts connected to said respective network terminal through resistors whereby said first contact and a number of said second contacts in accordance with said conductive band position releasably engage said conductive band on said camera loaded magazine to control said network in accordance with said film sensitivity.

5. The film magazine of claim 1 wherein said electrical element has a dimension varying in accordance with said film sensitivity, said magazine being for use with said light responsive network provided with a plurality of said second contacts connected to a common network predetermined point and being longitudinally and transversely offset relative to each other.

* * * * *